3,629,183
COMPOSITIONS OF VINYL CONTAINING DI-
ORGANOPOLYSILOXANE GUMS AND BORON
CONTAINING ORGANO-POLYSILOXANES
Jacques Proriol and Daniel Semanaz, Lyon, France, assignors to Rhone-Poulenc S.A., Paris, France
No Drawing. Filed May 2, 1969, Ser. No. 821,451
Int. Cl. C08g 51/04
U.S. Cl. 260—37                                13 Claims

ABSTRACT OF THE DISCLOSURE

This invention discloses organopolysiloxane compositions which vulcanize to form adhesive elastomers on heating comprising a diorganopolysiloxane gum containing vinyl groups, an elastic boron-containing organopolysiloxane gum, a porogenic agent, a filler, an organic peroxide, and optionally a plasticiser.

---

The present invention relates to organopolysiloxane compositions which form adhesive elastomers on heating.

Self-adhesive fusible elastomers prepared from heat-curable organosilicon compositions containing a boron derivative or the product of reaction of a boron derivative with an organopolysiloxane have already been described (for example in French patent specifications Nos. 1,204,897, 1,205,990 and 1,238,947. When coiled in partially overlapping manner on a conductor, these elastomers automatically weld after a certain time, which may range from several tens of minutes to several hours. At the end of this time, the superposed portions of the elastomer ribbons become welded and the wound ribbon forms a continuous sleeve. The adhesion of such elastomers makes it possible to use them to form electric insulators by simply winding them around conductors, and to repair pipes, flexible piping and conduits of all kinds. However, until the various layers of ribbon have fused, friction or vibration may cause the wound ribbon to unwind.

It is also known that such adhesive elastomers exhibit little if any, adhesion to other materials (cf. French Patent 1,204,897), and more particularly their adhesion to the usual silicone elastomers is poor and does not resist moderate detaching forces. This disadvantage substantially precludes their use in the sticking of organosilicon elastomers of one type to those of different types and in the attachment of metallic elements, for example electrodes or handles to the surface of these elastomers. Thus, in the production of heating elements, electrodes are at present secured to conductive elastomers by clamping or stitching (cf. for example French Patent 1,436,366), which is not the most advantageous method.

It has also been proposed to stick the electrodes using an organosilicon composition which may be cured at ambient temperature, but this form of attachment is often insufficient and it is desirable to first fix the electrode to the support by other means, for example those described in French Pat. 1,040,871 (page 2, lines 32 to 39).

The present invention provides organopolysiloxane compositions which may be cured at elevated temperatures to form elastomers able to become almost instantaneously automatically welded.

The invention also provides compositions which can be cured to form elastomers which have a much greater adhesion to silicone elastomers than the self-adhesive fusible elastomers usually employed.

The organopolysiloxane compositions according to this invention comprise for every 100 parts by weight of (a) a diorganopolysiloxane gum of the formula:

$$R_4O{-}\left[\begin{array}{c}R_1\\|\\Si O\\|\\R_2\end{array}\right]_n{-}R_3 \quad (I)$$

wherein $R_1$ and $R_2$ may be the same or different and each represents a substituted or unsubstituted monovalent hydrocarbon radical, $R_3$ and $R_4$ may be the same or different and each represents hydrogen or a group $Si(R_5R_6R_7)$ wherein $R_5$, $R_6$ ant $R_7$ may be the same or different and each represents a substituted or unsubstituted monovalent hydrocarbon radical and $n$ is an integer of 1,000 to 20,000, with the proviso that at least 60% of $R_1$, $R_2$, $R_5$, $R_6$ and $R_7$) represent methyl radicals and 0.03 to 2% of $R_1$, $R_2$, $R_5$, $R_6$ and $R_7$ represent vinyl radicals;

(b) 4 to 12 parts by weight of an elastic organopolysiloxane gum prepared by reacting an oxygen-containing boron derivative with a liquid organopolysiloxane;

(c) 0.5 to 10 parts by weight of one or more porogenic agents;

(d) 20 to 90 parts by weight of a filler;

(e) 1 to 6 parts by weight of one or more organic peroxides;

and optionally up to 5 parts by weight of one or more plasticisers.

The diorganopolysiloxane gum (a) used in the composition of this invention may be terminated either by hydroxyl triorganosiloxyl groups or it may have a triorganosiloxyl group at one end and a hydroxyl group at the other.

Preferably, $n$ and the radicals $R_1$, $R_2$, $R_5$, $R_6$ and $R_7$ are such that the gum used has the viscosity of $2 \times 10^6$ to $10^8$ cp. at 25° C. By way of indication, the radicals $R_1$, $R_2$, $R_5$, $R_6$ and $R_7$ may be alkyl radicals containing 1 to 3 carbon atoms, i.e. methyl, ethyl or propyl; halogen- or cyano-substituted alkyl radicals containing 1 to 3 carbon atoms, e.g. 3,3,3-trifluoropropyl, β-cyanoethyl or γ-cyanopropyl; vinyl radicals; 2,2-difluorocyclopropyl radicals or unsubstituted or halogen-substituted phenyl radicals.

The preparation of these diorganopolysiloxane gums is described in various patents, for example in French Pat. Nos. 1,329,088, 1,382,285 and 1,451,269.

The elastic organopolysiloxane gum (b) may be prepared by heating an oxygen-containing boron derivative, such as boric anhydride, the boric acids and their esters with a liquid organopolysiloxane until an elastic, plastic, but friable, mass is obtained.

The organopolysiloxane liquid may be prepared by the hydrolysis and condensation of a diorganodichlorosilane containing a small proportion of an organotrichlorosilane and optionally of a triorganochlorosilane, silicon tetrachloride or silicic acid ester, so as to have 1.9 to 2 organic groups per silicon atom. These organic groups may be alkyl radicals such as methyl, ethyl or propyl; halogenated alkyl radicals such as 3,3,3-trifluoropropyl or 4,4,4-trifluorobutyl; cyanoalkyl radicals such as β-cyanoethyl and γ-cyanopropyl; vinyl or unsubstituted or halogen-substituted phenyl radicals. The viscosity at 25° C. of the starting liquid organopolysiloxanes generally varies from 3 to 1000 centipoises.

The amount of oxygen-containing boron derivative used, may be defined by the weight of boron, it contains and is generally 1 gram-atom of boron to 500-1500 g. of liquid organopolysiloxane.

The boron derivative is usually reacted with the liquid organopolysiloxane at a temperature of 150° to 250° C. and for 3 to 20 hours.

The amount of elastic gum used may vary from 4 to 12 parts by weight to 100 parts of diorganopolysiloxane gum of Formula I, it is this elastic gum which ensures the adhesion of the elastomers obtained from the compositions of this invention.

The cellular structure of the elastomers obtained from the compositions of this invention is produced by the evolution of an inert gas, usually nitrogen, in the compositions during their cross-linking. Thus, one or more porogenic agents, for example N,N'-dinitroso-N,N'-dimethylterephthalamide, dinitrosopentamethylenetetramine and azo-bisisobutyronitrile are incorporated into the compositions: 0.5 to 10 parts by weight of porogenic agent to 100 parts of gum of Formula I are used.

The fillers used may include the silicas of combustion having a large specific surface, the silicas of precipitation also having a large specific surface and many reinforcing carbon blacks such as those of the electrically conductive type. To improve the reinforcing power of the silicas it is particularly desirable to treat them with an organopolysiloxane such as octamethylcyclotetrasiloxane. The mean diameter of the filler particles is of the order of a few m$\mu$ or a few tens of m$\mu$. The quantity of filler used depends upon the nature of these fillers and upon the desired hardness of the elastomers; in general from 20 to 90 parts of fillers to 100 parts of diorganopolysiloxane gum of the Formula I are used.

The cross-linking of the composition is achieved by using an organic peroxide or a mixture of organic peroxides. Suitable peroxides include cumyl peroxide, benzoyl peroxide, t.-butylperbenzoate, 2,4-dichlorobenzoyl peroxide, di-t.butylperoxide and the percarbonate of O,O-t.-butyl and of O-isopropyl. 1 to 6 parts of such peroxides to 100 parts of diorganopolysiloxane gum of Formula I cross-link the compositions effectively.

To avoid hardening of the compositions during storage, it is desirable to add thereto one or more organosilicon compound, as a plasticiser. Such compounds include (tetramethylethylenedioxy)dimethylsilane, diphenylsilanediol, and the hydroxylated or alkoxylated oils. Other compounds which may be employed are mentioned in French patent specifications Nos. 1,111,969 and 1,161,094 and United States patent specification No. 2,890,188. No more than 5 parts of plasticiser are used to 100 parts of gum of Formula I.

The compositions of the invention may be prepared by intimately mixing the constituents enumerated above using the apparatus usually employed in the rubber industry. Preferably the fillers, plasticisers and porogenic agents and adjuvants such as pigments, antioxidants and stabilisers are first homogeneously dispersed in the diorganopolysiloxane gum of Formula I and the elastic gum is then added, using, for example, a two-roll mixer, the mixture preferably being maintained at 80 to 100° C. When the elastic gum is completely incorporated the mixture may be left at ambient temperature and the organic peroxide may be added immediately or at the time of use.

Regardless of the procedure adopted the compositions may be extruded and calendered to form sheets, ribbons, strips or other shapes.

By simple heating in air to a temperature of 150° to 280° C. the various articles harden to form elastomers. The length of the heating varies with the temperature, and is generally several minutes at about 150° C. or several tens of seconds at about 280° C.

The compositions of this invention harden during this heating and simultaneously the porogenic agent decomposes to liberate an inert gas into the elastomer. Thus adhesive and micro-cellular organosilicon elastomers are formed.

The applications of these fusible cellular elastomers are varied and useful. In electricity, they may be used to insulate conductors by simply being wound as adhesive tapes around the latter. They may also be used to stop leakages in pipes and conduits carrying water, e.g. the pipes of sanitary apparatus, radiators or boilers. When used in either of these ways the products of this invention form immediately on being wound, a continuous sheath which prevents unwinding caused by shocks and vibrations.

In addition, the compositions of this invention may be used to fix elements of any nature, for example of metal, to silicone elastomers, such as handles, strips or decorative motifs. One remarkable use is in the attaching of conductive electrodes to organosilicon elastomers which contain an electrically conductive carbon black filler to produce heating elements, such as those described in French Patents 1,344,405 or 1,436,366.

In order to fix the electrodes, they are stuck by simple manual pressure along two opposite edges of a plate, strip or tape of conductive elastomer, and an adhesive cellular tape obtained by curing the compositions of this invention and which is of greater width than the electrodes, is placed along the whole length thereof. This technique constitutes an advantageous substitute for the sticking, clamping and stitching which are used at present and which may take a longer time and do not always give satisfactory results.

The cellular and fusible elastomers of this invention may also be employed as adhesive plates and tapes for joining together similar or different organosilicon elastomers. This application is very advantageous when organosilicon elastomers used as protective coatings on fragile parts and devices, such as electronic devices, have to be reinforced owing to cracking or to increase safety factors.

The following examples illustrate the invention.

EXAMPLE 1

A homogeneous composition A1 is prepared by malaxating the following ingredients using a two-roll mixer:

| | G. |
|---|---|
| Dimethylpolysiloxane gum (having terminal hydroxyl groups, containing 0.20% by weight of methylvinylsiloxy units and having a viscosity at 25° C. of $18 \times 10^6$ cp.) | 100 |
| Silica of combustion (having a large specific surface and treated with octamethylcyclotetrasiloxane) | 36 |
| "Elastic" methylpolysiloxane gum (prepared as described below) | 6.8 |
| $\alpha,\omega$-Dihydroxydimethylpolysiloxane oil (containing 13% by weight of hydroxyl groups, viscosity of 40 centipoises at 25° C.) | 1.35 |
| Paste formed from N,N'-dinitroso-N,N'-dimethylterephthalamide and an $\alpha,\omega$-bis-(trimethylsiloxy)-dimethylpolysiloxane oil having a viscosity of 100,000 centipoises at 25° C., in a ratio of 50:50 | 11 |
| t.-Butyl perbenzoate | 1.17 |
| Paste formed from benzoyl peroxide and an $\alpha,\omega$-bis-trimethylsiloxy)dimethylpolysiloxane oil having a viscosity of 1000 centipoises at 25° C. in a ratio of 50:50 | 1.17 |

The composition is extruded to form a tape RA1, which is then cured by passing it for 75 seconds through a furnace at an average temperature of 180–220° C. The resultant tape is of a micro-cellular material and is 28 mm. wide and 0.5 mm. thick. When this tape is wound in semi-overlapping manner around a conductive copper bar, it is found that the overlapping sections instantaneously weld together to form a uniform, insulating cellular coating.

If a tape, RB1, prepared from a composition B1 which is identical in all respects to composition A1, except that it does not contain the 11 g. of paste containing N,N'-dinitroso-N,N'-dimethylterephthalamide, is wound in a similar way to tape RA1, it is found that it is necessary to wait at least 2 hours before a uniform coating forming a homogeneous unit and exhibiting no trace of winding is obtained.

In addition, three elastomers of known type are prepared by curing the following compositions in the ambient air:

Composition K (organopolysiloxane composition which may be cured at ambient temperature after the addition of a catalyst)

|  | G. |
|---|---|
| α,ω-Dihydroxydimethylpolysiloxane oil (viscosity of 5000 centipoises at 25° C. containing 0.2% by weight of hydroxyl groups) | 100 |
| Iron oxide | 65 |
| Diatomaceous silica | 25 |
| Ethyl polysilicate titrating 40% by weight of $SiO_2$ | 3 |
| Product of the reaction of dibutyl-tin dilaurate with butyl orthotitanate, when mixed in a ratio by weight of 100:27 and heated for 3 hours at 120° C. | 1 |

This composition hardens to form an elastomer when left for 24 hours at ambient temperature (20° C.).

Composition L (organopolysiloxane composition which may be cured to form an elastomer at ambient temperature after addition of a catalyst)

|  | G. |
|---|---|
| α,ω-Dihydroxydimethylpolysiloxane oil (having a viscosity of 5000 centipoises at 25° C., containing 0.2% by weight of hydroxyl groups) | 100 |
| Finely divided calcium carbonaate | 40 |
| Ethyl polysilicate (titrating 40% by weight of $SiO_2$) | 3 |
| Product of the reaction of dibutyl-tin dilaurate and butyl orthotitanate, when mixed in a ratio by weight of 100:27, and heated for 3 hours at 120° C. | 1 |

This composition hardens to form an elastomer when left for 24 hours at ambient temperature (20° C.).

Composition M (organopolysiloxane composition stable in storage in the absence of moisture and which may be cured to form an elastomer at ambient temperature under the action of water in liquid or vapour form)

|  | G. |
|---|---|
| α,ω-Dihydroxydimethylpolysiloxane oil (having a viscosity of 20,000 centipoises at 20° C., containing 0.1% by weight of hydroxyl groups) | 100 |
| Silica of combustion having large specific surface | 5 |
| Diatomaceous silica | 25 |
| Methyltriacetoxysilane | 4 |

When left for 48 hours in the ambient air (temperature 20° C.) this composition is converted to an elastomer.

The tapes RA1 and RB1 (for comparison) are placed on the surface of each of these elastomers and made to stick thereto by applying a pressure of 5 bars for 30 seconds. The force (in kg./cm.), necessary to detach the tapes is measured with a dynamometer. The results are set out in the following table:

|  | Detaching force (kg./cm.) on— | | |
|---|---|---|---|
|  | Elastomer K | Elastomer L | Elastomer M |
| Tape RA1 | 0.250 | 0.145 | 0.290 |
| Tape RB1 | 0.120 | 0.090 | 0.090 |

As can be seen the adhesion of tape RA1 to the organopolysiloxane elastomer is clearly greater than that of tape RB1.

The "elastic" gum was prepared from the following compounds:

|  | G. |
|---|---|
| Dimethylpolysiloxane (prepared by hydrolysing, in ethereal medium, a mixture of dimethydichlorosilane and methyltrichlorosilane, in a mole ratio of 99:1 respectively) | 156.5 |
| Boric acid | 11.6 |
| Anhydrous ferric chloride | 0.33 |

These reactants are gradually brought to a temperature of about 200° C. and then maintained at this temperature for about 10 hours to remove about 10% by weight of volatile products.

EXAMPLE 2

3 compositions, A2, A3 and A4, which are similar to that of Example 1, except that they contain respectively 2, 5 and 8 g. (instead of 11 g.) of the paste formed from N,N'-dinitroso-N,N'-dimethylterephthalamide and an α,ω-bis-(trimethylsiloxy)dimethylpolysiloxane oil having a viscosity of 100,000 centipoises at 25° C., in a ratio of 50:50 are prepared.

By the procedure described in Example 1 adhesive microcellular tapes RA2, RA3 and RA4 are produced from these three compositions and these are applied to elastomer M, described in Example 1, and the force (in kg./cm.) required to detach the tapes, is measured using a dynamometer. It is found that this force is 0.130 kg./cm. for tape RA2, 0.160 kg./cm. for tape RA3 and 0.200 kg./cm. for tape RA4. These values are also higher than that for tape RB1 determined in Example 1.

EXAMPLE 3

A composition A5 is prepared by malaxating the following ingredients using a two-roll mixer:

|  | G. |
|---|---|
| Dimethylpolysiloxane gum (having terminal trimethylsiloxy radicals containing 0.23% by weight of methylvinylsiloxy units and having a viscosity of $25 \times 10^6$ cp. at 25° C.) | 100 |
| Acetylene black (having a specific surface of 80 m.²/g., and the particles of which have a mean diameter of 27 mµ) | 50 |
| "Elastic" methylpolysiloxane gum (as used in Example 1) | 7.5 |
| Paste formed from N,N'-dinitroso-N,N'-dimethylterephthalamide and an α,ω-bis-(trimethylsiloxy) dimethylpolysiloxane oil having a viscosity of 100,000 centipoises at 25° C., in a ratio of 50:50 | 12 |
| Cumyl peroxide | 4.25 |

A conductive self-adhesive micro-cellular tape RA5 (0.5 mm. thick and 28 mm. wide) is prepared from this composition, using the method described in Example 1. When wound in semi-overlapping manner around a bar of any nature, the overlapping sections of the tape instantly weld together to form a uniform mass in which the initial turns are no longer visible.

If a similar composition is prepared but which does not contain the 12 g. of paste containing N,N'-dinitroso-N,N'-dimethylterephthalamide, the tape RB5 produced from this now composition only welds together after about 2 hours.

Tapes RA5 and RB5 are each applied to the surface of the elastomers K, L and M and to an elastomer N obtained by curing at elevated temperature (10 min. at 150° C. under 50 bars and then 16 hours in a ventilated oven at 250° C.), of a composition comprising

|  | G. |
|---|---|
| Dimethylpolysiloxane gum containing terminal hydroxyl radicals (0.20% by weight of methylvinylsiloxy units; viscosity at 25° C. $18 \times 10^6$ cp. | 100 |
| Silica of combustion (having large specific surface, and treated with octamethylcyclotetrasiloxane) | 50 |
| α,ω - dihydroxydimethylpolysiloxane oil (containing 13% by weight of hydroxyl groups, viscosity 40 poises at 25° C.) | 1.35 |
| Paste formed from 2,4-dichlorobenzoyl peroxide and of an α,ω-bis-(trimethylsiloxy)dimethylpolysiloxane oil (viscosity 1000 centipoises at 25° C.) in a ratio of 50:50 | 1.9 |

The measurements of the detaching forces are set out in the following table:

|  | Detaching force (kg./cm.) on— | | | |
|---|---|---|---|---|
|  | Elastomer K | Elastomer L | Elastomer M | Elastomer N |
| Tape RA5 | 0.220 | 0.150 | 0.215 | 0.450 |
| Tape RB5 | 0.150 | 0.080 | 0.165 | 0.315 |

It is found that the adhesion exhibited by the tape RA5, is in all cases, greater than that exhibited by the tape RB5.

EXAMPLE 4

(A) Debatched "satin" type glass fabric (weighing 87 g./m.$^2$ and in the form of a tape of 25 cm. wide and 0.08 mm. thick), is impregnated by being dipped into a bath containing:

|  | G. |
|---|---|
| Dimethylpolysiloxane gum (containing 0.23% by weight of methylvinylsiloxy units) used in Example 3 | 100 |
| Silica of combustion having a large specific surface, and treated with octamethylcyclotetrasiloxane | 28 |
| $\alpha,\omega$-dihydroxydimethylpolysiloxane oil (13% by weight of hydroxyl groups, viscosity 40 centipoises at 25° C.) | 5.5 |
| Tri-(2-methoxyethoxy)vinylsilane | 6.7 |
| Paste formed from 2,4-dichlorobenzoyl peroxide and an $\alpha,\beta$- bis-(trimethylsiloxy)dimethylpolysiloxine oil having a viscosity of 1000 centipoises at 25° C. in a ratio of 50:50 | 2.8 |
| Toluene | 756 |

After being passed through the bath, the tape is passed through a vertical furnace, in which it undergoes two successive heatings, one at 95° C. for 5 min. and the other at 155° C., also for 5 min. The layer of silicone elastomer with which the glass fabric is impregnated weighs about 18 g./m.$^2$.

(B) A layer of an organopolysiloxane composition, which may be cured to form an elastomer, prepared by malaxation on a two-roll mixer of the following components:

|  | G. |
|---|---|
| Dimethylpolysiloxane gum (containing 0.23% by weight of methylvinylsiloxy units) used in Example 3 | 100 |
| Acetylene black (having a specific surface of 80 m.$^2$/g., and the particles of which have a mean diameter of 27 m$\mu$) | 70 |
| Cumyl peroxide | 4.25 | is deposited by calendering onto one of the two faces of the previously impregnated tape.

When the thus coated tape is passed for 35 seconds through a furnace maintained at a temperature of 260–280° C., the composition is hardened to form a uniformly deposited conductive elastomer which adheres well to the glass fabric and which weighs 171 g./m.$^2$. The total thickness of the tape is finally 0.25 mm. and its weight 276 g./m.$^2$.

(C) A rectangular portion is cut from the tape thus coated with conductive elastomer and two copper electrodes 5 mm. wide and 0.1 mm. thick are placed along two opposite edges of it on the face coated with conductive elastomer. These two electrodes, which are spaced 145 mm. apart, define a rectangular heating element measuring 170 mm. x 145 mm. To fix them along their entire length, the conductive micro-cellular self-adhesive tape RA5 (28 mm. wide) which is described in Example 3 is placed along their entire length and that portion of the tape which projects on either side of the electrode is then stuck to the heating element by simple manual pressure. The said electrodes are thus firmly fixed between the heating fabric and the micro-cellular tape.

When a potential of 50 volts is applied to and a current of 0.13 ampere is passed through the heating element its temperature is maintained constantly at about 35° C. when the ambient temperature is about 20° C.

The electrodes are stuck in a similar way to the conductive adhesive using tape RB5 described in Example 3.

When it is attempted to detach the tape RA5 it becomes torn and is removed only in small fragments and by vigorous scraping. On the other hand, the tape RB5 can be completely removed without difficulty.

EXAMPLE 5

A dispersion of an organosilicon composition curable at ambient temperature and comprising:

|  | G. |
|---|---|
| $\alpha,\alpha$-Dihydroxydimethylpolysiloxane oil (having a viscosity of 500 centipoises at 25° C., titrating 0.35% by weight of hydroxyl groups) | 100 |
| Acetylene black (having a specific surface of 190 m.$^2$/g. the particles of which have a mean diameter of 18 m$\mu$) | 30 |
| Ethyl polysilicate (titrating 40% by weight of SiO$_2$) | 5.8 |
| Product of the reaction of dibutyl-tin dilaurate with butyl orthotitanate, mixed in a proportion by weight of 100:27 and heated for 3 hours at 120° C. | 1.5 |
| Mixture of hydrocarbons having boiling points ranging from 93° C. to 114° C. and having a density of 0.722 at 15° C. | 38.5 |
| Mixture of hydrocarbons having boiling points ranging from 148° C. to 189° C. and having a density of 0.775 at 20° C. | 38.5 | is brushed on to a rectangular slab pretreated with conventional adhesive undercoating.

After drying for one hour in the ambient air to eliminate the solvent and being left for 24 hours at 20° C. to enable the composition to harden into the form of an elastomer, the slab is then coated with a layer of organosilicon elastomer of a mean thickness of 0.25 mm.

Two copper electrodes (5 mm. wide and 0.1 mm. thick) are placed on the coated slab stuck by the method described in Example 4 using the micro-cellular self-adhesive conductive tape RA5.

The two electrodes, which are spaced 500 mm. apart, define a rectangular heating element measuring 500 mm. x 250 mm. A potential of 110 volts is applied to this heating element and a current of 0.82 a. passes.

After the potential of 110 volts has been applied for 3 hours, the temperature, measured on the conductive elastomer surface of this heating element remains constant at about 46° C., the ambient temperature being 25° C.

If the experiment is repeated using the same conditions except that the concrete slab is replaced by an agglomerated-wood board, it is found that the heating element passes a current of 0.5 a. at a voltage of 100 volts, and at the end of 3 hours the temperature measured on the conductive elastomer surface remains constant at about 46° C. (ambient temperature 25° C.).

We claim:

1. A composition comprising for every 100 parts by weight of
(a) a diorganopolysiloxane gum of the formula:

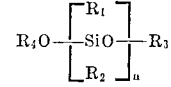

wherein R$_1$ and R$_2$ may be the same or different and each represents a substituted or unsubstituted monovalent hydrocarbon radical, R$_3$ and R$_4$ may be the same or different and each represents hydrogen or a group Si(R$_5$R$_6$R$_7$) wherein R$_5$, R$_6$ and R$_7$ may be the same or different and each represents a substituted or unsubstituted monovalent hydrocarbon radical and $n$ is an integer of 1000 to 20,000 with the proviso that at least 60% of R$_1$, R$_2$, R$_5$, R$_6$ and R$_7$ represent methyl radical and 0.03 to 2% of $R_1$, $R_2$, $R_5$, $R_6$ and $R_7$ represent vinyl radicals;

(b) 4 to 12 parts by weight of an elastic organ-polysiloxane gum prepared by reacting an oxygen-containing boron derivative selected from the group consisting of boric anhydride, a boric acid and a boric acid ester with a liquid organopolysiloxane containing one or more unsubstituted and/or halogen- and/or cyano-substituted alkyl radicals containing 1 to 4 carbon atoms, vinyl radicals and/or unsubstituted and/or halogen-substituted phenyl radicals;

(c) 0.5 to 10 parts by weight of one or more porogenic agents;

(d) 20 to 90 parts by weight of a filler;

(e) 1 to 6 parts by weight of one or more organic peroxides; and optionally up to 5 parts by weight of one or more plasticisers.

2. A composition according to claim 1 wherein the diorganosiloxane gum (a) has a viscosity at 25° C. of $2 \times 10^6$ to $10^8$ cp.

3. A composition according to claim 1 wherein $R_1$ and $R_2$ may be the same or different and $R_5$, $R_6$ and $R_7$ may be the same or different and each represents an unsubstituted or halogen- or cyano-substituted alkyl radical containing 1 to 3 carbon atoms, a vinyl radical, a 2,2-difluorocyclopropyl radical or an unsubstituted or halogen-substituted phenyl radical.

4. A composition according to claim 1 wherein $R_1$ and $R_2$ may be the same or different and $R_5$, $R_6$ and $R_7$ may be the same or different and each represents a methyl or a vinyl radical.

5. A composition according to claim 1 wherein the liquid organopolysiloxane used in the preparation of (b) contains 1.9 to 2 organic groups per silicon atoms.

6. A composition according to claim 1 wherein the liquid organopolysiloxane used in the preparation of (b) is dimethylpolysiloxane.

7. A composition according to claim 1 wherein the liquid organopolysiloxane used in the preparation of (b) has a viscosity at 25° C. of 3 to 1,000 centipoises.

8. A composition according to claim 1 wherein in the preparation of (b), the oxygen-containing boron derivative and the liquid organopolysiloxane are used in a proportion of 1 gram-atom of boron to 500 to 1500 g. of liquid organopolysiloxane.

9. A composition according to claim 1 wherein the porogenic agent is one or more of N,N'-dinitroso-N,N'-dimethylterephthalamide, dinitrosopentamethylenetetramino and azo-bis-isobutylronitrile 10. A composition according to claim 1 wherein the filler is a silica of combustion, a silica of precipitation and/or a carbon black.

11. A composition according to claim 1 wherein the silica has been treated with octamethylcyclotetrasiloxane.

12. A composition according to claim 1 wherein the organic peroxide is one or more of cumyl peroxide, benzoyl peroxide, t-butyl perbenzoate, 2,4-dichlorobenzoyl peroxide, di-t-butyl peroxide and the percarbonate of O,O-butyl and O-isopropyl.

13. Elastomers produced by heating a composition as claimed in claim 1.

References Cited

UNITED STATES PATENTS 3,070,560   12/1962   Metevia _____ 260—825

MORRIS LIEBMAN, Primary Examiner

L. T. JACOBS, Assistant Examiner

U.S. Cl. X.R.

260—825